March 31, 1931.  C. R. BAKER  1,798,923
HEATING SYSTEM
Filed Jan. 21, 1930
FIG. I.
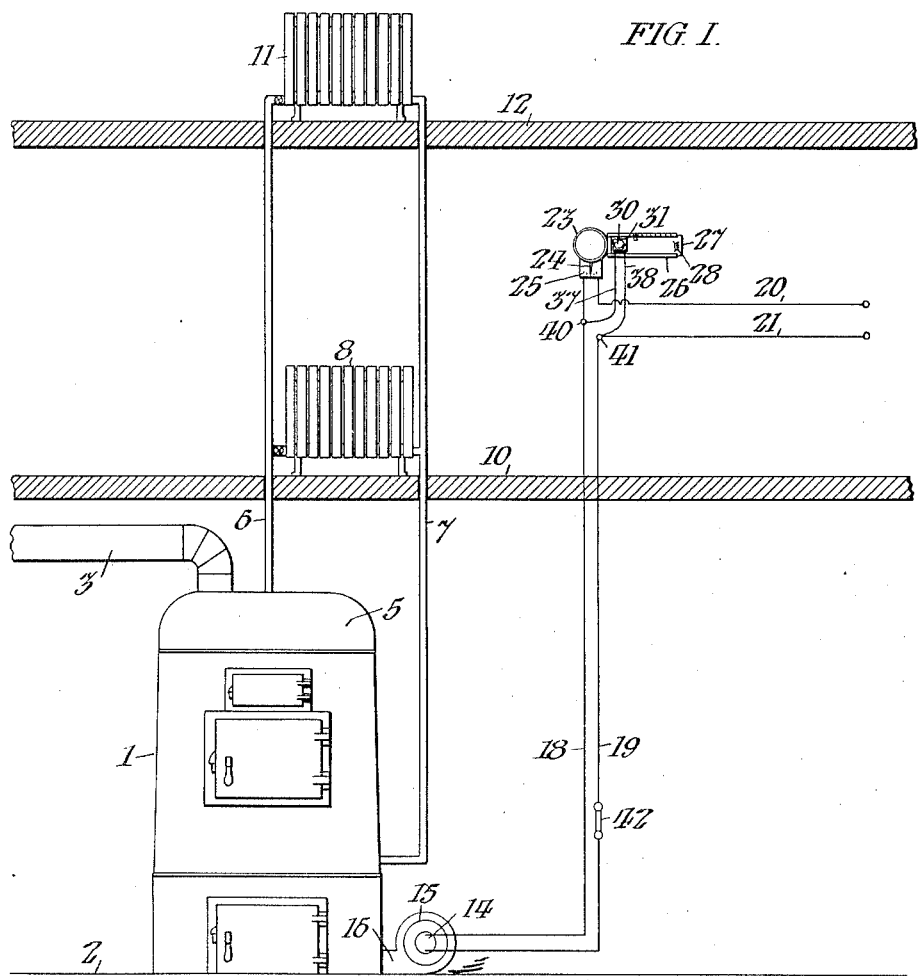
FIG. II.
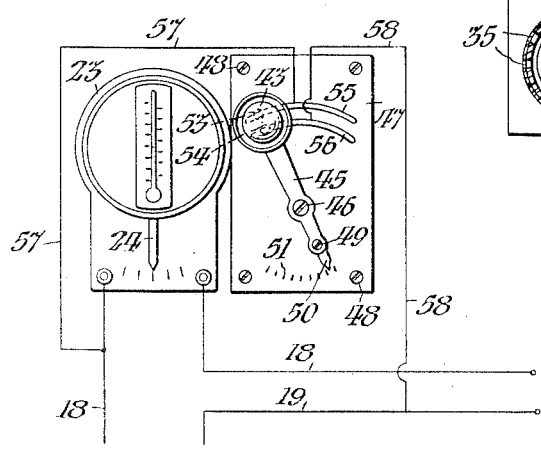
FIG. III.
FIG. IV.
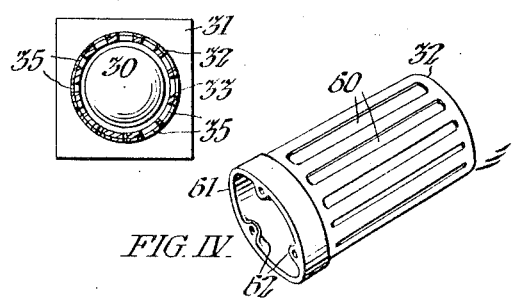
INVENTOR:
CHARLES R. BAKER,
BY
Arthur C. Paige
Attorney.

Patented Mar. 31, 1931

1,798,923

UNITED STATES PATENT OFFICE

CHARLES R. BAKER, OF PHILADELPHIA, PENNSYLVANIA

HEATING SYSTEM

Application filed January 21, 1930. Serial No. 422,270.

My invention is particularly applicable to systems in which the heating medium is water circulated through radiators remote from a furnace in which the water is heated, and in which the desired temperature at the radiators is only attained after a considerable lapse of time, although the temperature of the water desired at the radiators is attained at the furnace immediately after an electric motor fan at the furnace is set in operation; which fan may effect a forced draft for a coal fire, or produce a combustible mixture of air with a fluid fuel, such as petroleum distillate or gas. The delay in attainment of the proper temperature at the radiators is due to the sluggish circulation of the water and consequent sluggish interchange of temperature therein, which is characteristic of such water heating systems, regardless of the kind of fuel employed. Therefore, if the electric motor is controlled by an ordinary thermostatic switch affected only by room temperature local to a radiator remote from the furnace, a large amount of fuel is wasted in overheating the furnace by the operation of said motor until the proper room temperature is attained. Therefore, a considerable economy may be affected by interrupting the operation of the motor at and during short intervals, throughout the time from the starting of the motor until the proper room temperature is attained by radiation from the radiator local to the thermostat. Various attempts have been made to effect such intermission of operation of the motor by complicated electrical apparatus; for instance, Letters Patent of the United States 1,583,496 granted May 4, 1926, to W. L. Shafer, shows such a complicated system wherein the motor is included in a high voltage circuit and the thermostat in a low voltage circuit with various relay devices for modifying the high voltage circuit by electrical changes in the low voltage circuit. I disclaim the various systems disclosed in said Shafer patent and all other systems of that type.

In accordance with my invention, the electrically actuated air blower motor at the furnace is directly energized from a high voltage supply circuit such as used for electric lighting, for instance, 110 or 220 volt alternating current, and automatically controlled by a thermostatic switch directly included in one of the supply conductors to said motor; said switch being local to a radiator connected with the furnace but remote therefrom. A system limited to those elements would permit the above contemplated overheating of the furnace until the proper room temperature is attained by radiation from the radiator local to the thermostat. However, I also provide a source of heat which is auxiliary to the furnace and local to the thermostat and electrically actuated in coordinated relation with the furnace motor to effect what may be termed a supervisory control of the thermostat during the time that the furnace is raising the temperature of the atmosphere local to the thermostat to the degree for which the latter is set. Such auxiliary heating element may be a small incandescent lamp, or resistance coil, included in a circuit which extends in parallel relation with the motor, across the supply lines, but is local to the said thermostat; so that said auxiliary heating element is energized whenever the motor is energized, and I provide simple mechanical means for adjusting said auxiliary heater bodily toward and away from said thermostat to vary the intervals at and during which the thermostatic switch shall be opened by radiation of heat from such auxiliary electrical source. For instance, in the form of my invention hereinafter described, by setting a small incandescent lamp bulb with its wall five-eighths of an inch from the casing of the thermostatic switch, the latter is heated to the room temperature of, say, 70°, for which it is set, within five minutes after the motor is started, with the effect of breaking the motor circuit, and permitting the furnace to cool down for a succeeding five minutes during which the thermostatic switch is caused to close again by the fact that the room temperature for which it is set has not been attained, and the motor circuit is thus automatically interrupted at intervals of five minutes during an hour or more after the motor is started and until the proper room temperature is attained at the thermostat, by radiation from the radiator local thereto. The periods of time at and during which the motor circuit is thus interrupted may be varied by varying the distance of the auxiliary heating unit from the theremostat; said heating unit and its appurtenances being an entity entirely mechanically and electrically separate from the thermostat and adapted to be independently marketed as a heating system accessory.

As hereinafter described, the entire auxiliary electrical heating and thermostat controlling device of my invention is mounted upon a base independent of the other parts of the system, and may be manufactured for a few cents and adjusted by an unskilled operator such as an ordinary householder, and effect an enormous saving of fuel which would otherwise be wasted.

Therefore, it is to be understood that the essential feature of my invention is an organized electrical unit including a base having means to attach it in stationary position, and carrying an electrical heating element which may be manually adjusted to and fro on that base, and having means adapted to secure it in adjusted position. However, my invention includes the various novel features of construction and arrangement hereinafter more definitely specified.

In said drawings, Fig. I is a diagrammatic elevation of an ordinary house heating system of the hot water type, including a furnace in the cellar and a thermostatic room switch above the first floor with an electrical auxiliary heating unit in coordinated relation therewith and adapted to be rectilinearly reciprocated toward and away from said thermostat.

Fig. II shows a modified form of my invention including an auxiliary heating device which is adapted to be oscillated toward and away from the thermostat.

Fig. III is a transverse sectional view of an auxiliary heating unit, such as indicated in Figs. I and II, provided with a rotatable shield adapted to adjustably vary the amount of heat radiated from the auxiliary heating element toward the thermostatic switch while said heating unit is maintained at a given distance from said thermostat.

Fig. IV is a perspective view of a modified form of said rotatable shield and the socket in which it is mounted to rotate.

Referring to Fig. I; the furnace 1 which is the main source of heat, is mounted upon the cellar floor 2 and provided with the chimney flue 3. The water container 5 of said furnace is connected by the pipes 6 and 7 with the radiator 8 upon the first floor 10, and with the radiator 11 upon the second floor 12. It is to be understood that the hot water rises from said furnace through the pipe 6 to the radiators aforesaid and returns from the latter through the pipe 7.

The electric motor 14 is operatively connected with the rotary fan 15 in the blower casing 16, which is adapted to discharge air under pressure into said furnace to effect a forced draft for a coal fire or produce a combustible mixture of air with a fluid fuel, as above contemplated. Said motor is adapted to be energized through the conductors 18 and 19 leading from the supply terminals 20 and 21 which, as above noted, may be part of the electric lighting system of the building in which said heating system is installed. The thermostatic switch 23 is directly included in said supply conductor 18 leading to said motor, but is located remote from the furnace 1 and conveniently in the room containing said radiator 8. Said thermostat 23 has an index lever 24 which is movable with respect to a scale of graduations 25 so that said switch may be set to any desired temperature, within the range of said scale, (for instance 70° F.), so that the circuit to said motor 14 through said conductor 18 is closed whenever the room temperature local to said thermostat 23 falls below the temperature for which it is set, and said circuit is broken whenever the room temperature rises above that predetermined temperature. As above noted, such a construction and arrangement of the thermostat would maintain the motor circuit closed and the blower operating continuously unless and until the temperature of the atmosphere local to said radiator 8 is raised to the degree to which said thermostat pointer 24 is set. However, I provide the auxiliary electrical heating appliance which includes the base 26 adapted for attachment to the wall of the building adjoining said thermostat 23, and having a slideway in which is mounted the carrier 27, so that the latter is adapted to be manually reciprocated, horizontally, by means of the handle lug 28 on said carrier. Said carrier 27 carries the auxiliary heating unit 30 which may be an incandescent lamp bulb or other electrical resistance heating element, which is preferably detachably mounted in the socket 31 on said carrier 27 and provided with the shield 32 which is conveniently formed of a circular tube of thin sheet metal with an asbestos fabric lining 33. As indicated in Fig. III, said shield may be provided with a circumferential series of apertures 35, of respectively different area, so that said shield may be turned with respect to said carrier, without moving the latter, to vary the effective radiation from said auxiliary heating unit 30 toward said thermostat 23. However, I prefer to effect the adjustment of said auxiliary heating unit with respect to said thermostat by both movement of said carrier 27 and movement of said shield 32.

In order to cause said auxiliary heating unit 30 to operate contemporaneously with the operation of the furnace blower fan 15, I prefer to connect said unit in parallel relation with said fan motor 14 in a bridge from said conductor 18 to said conductor 19, formed of the conductors 37 and 38 which are flexible and connected with the respective stationary terminals 40 and 41.

I find it convenient to include in said motor circuit the switch 42, by which it may be manually opened or closed. It may be observed that said thermostat 23 is in series relation with both said fan motor 14 and said auxiliary heating unit 30, so that when said thermostat 23 breaks the circuit to the motor 14, it also breaks the circuit to said auxiliary heating unit 30.

The adjustment of said auxiliary heating appliance with respect to the thermostat should be varied in accordance with the characteristics of the system including the furnace 1, so that during the entire time from the starting of the furnace into operation, until the atmosphere in the room containing the thermostat 23 reaches the desired degree, said thermostat shall be caused to open and close the fan motor circuit at such intervals as to prevent overheating the furnace, and most economical consumption of the fuel and such adjustment may vary widely with heaters of the same style and size, in accordance with the furnace and other factors which determine the rate at which the water circulates in the system. That is to say; the less rapidly the water circulates for a given rise in temperature at the furnace, the more frequently the fan motor circuit should be interrupted, and the best adjustment can be determined only by the trial.

In the form of my invention shown in Fig. II; the auxiliary heating element 43 is mounted upon the carrier 45, which is a lever fulcrumed at 46 upon the base 47 which has screws 48 or other suitable means for attaching it in stationary position upon the building wall adjoining the thermostat 23. Said lever has a set screw 49 for securing it in adjusted position with respect to said base 47 in any position which may be predetermined by the relative position of the pointer 50 with respect to the arcuate scale 51.

Said auxiliary heating unit 43 may have spring contacts 53 and 54 in sliding engagement with the respectively stationary terminals 55 and 56 of the respective conductors 57 and 58 which form a bridge from the conductor 18 to the conductor 19, as above described.

Although said shield 32 may be provided with series of perforations 35; I prefer to form it with a series of slots 60, of respectively different widths at different regions of its circumference, and to mount it for rotation in the socket 61 having perforated lugs 62 for screwed connection with the movable carrier.

Therefore, I do not desire to limit myself to the precise details of construction and arrangement herein set forth, as it is obvious that various modifications may be made therein without departing from the essential features of my invention, as defined in the appended claims.

I claim:

1. In thermostatic apparatus controlling the operation of a motor affecting the combustion of fuel in a furnace; the combination with a thermostat; of an auxiliary heating unit influencing said thermostat; and means movable to bodily shift said auxiliary heating unit toward and away from said thermostat; whereby said thermostat may be caused to open and close the motor circuit by radiation from said auxiliary heating unit, before the thermostat is caused to operate by heat from said furnace, and at intervals which are variable by moving said auxiliary heating unit bodily toward and away from said thermostat.

2. Apparatus as in claim 1; wherein the auxiliary heating unit is provided with a shield having apertures of respectively different areas thruout its extent; said shield being movable to vary the effective radiation thru it from said auxiliary heating unit to said thermostat.

3. Apparatus as in claim 1; wherein the auxiliary heating unit is adapted for reciprocation in a slideway; whereby said auxiliary heating unit may be moved toward and away from said thermostat.

4. Apparatus as in claim 1; including means including the relative position of said auxiliary heating unit to said thermostat.

In testimony whereof, I have hereunto signed my name at Philadelphia, Pennsylvania, this twenty-third day of December, 1929.

CHARLES R. BAKER.

CERTIFICATE OF CORRECTION.

Patent No. 1,798,923.             Granted March 31, 1931, to

CHARLES R. BAKER.

It is hereby certified that error appears in the printed specification of the above numbered patent requiring correction as follows: Page 3, line 101, claim 4, for the word "including" read indicating; and that the said Letters Patent should be read with this correction therein that the same may conform to the record of the case in the Patent Office.

Signed and sealed this 21st day of April, A. D. 1931.

(Seal)

M. J. Moore,
Acting Commissioner of Patents.